US012620656B2

(12) United States Patent
Wang et al.

(10) Patent No.: US 12,620,656 B2
(45) Date of Patent: *May 5, 2026

(54) LIQUID RESISTANT BATTERY PACK

(71) Applicant: Apple Inc., Cupertino, CA (US)

(72) Inventors: Pengchuan Wang, San Jose, CA (US);
Arun D. Chawan, Berkeley, CA (US);
Dominic Pitera, San Francisco, CA
(US); Karl A. Gazdowski, Los Gatos,
CA (US); Kyle Tse, Fremont, CA (US);
Nath B. Chhiv, Alameda, CA (US);
Nathan J. Bohney, Campbell, CA
(US); Shreshtha U. Kumar, Cupertino,
CA (US); Surojit Ganguli, San Jose,
CA (US)

(73) Assignee: Apple Inc., Cupertino, CA (US)

( * ) Notice: Subject to any disclaimer, the term of this
patent is extended or adjusted under 35
U.S.C. 154(b) by 856 days.

This patent is subject to a terminal dis-
claimer.

(21) Appl. No.: 17/839,911

(22) Filed: Jun. 14, 2022

(65) Prior Publication Data

US 2023/0099230 A1 Mar. 30, 2023

Related U.S. Application Data

(60) Provisional application No. 63/248,258, filed on Sep.
24, 2021, provisional application No. 63/248,251,
filed on Sep. 24, 2021.

(51) Int. Cl.
*H01M 50/14* (2021.01)
*H01M 50/124* (2021.01)

(52) U.S. Cl.
CPC ....... *H01M 50/14* (2021.01); *H01M 50/1245*
(2021.01); *H01M 2220/30* (2013.01)

(58) Field of Classification Search
CPC ............. H01M 50/14; H01M 50/1245; H01M
50/121; H01M 50/141; H01M 50/186;
H01M 50/528; H01M 50/533; H01M
50/55; H01M 50/124
See application file for complete search history.

(56) References Cited

U.S. PATENT DOCUMENTS

| | | | |
|---|---|---|---|
| 2009/0162743 A1* | 6/2009 | Nam ...................... | H01M 6/185 |
| | | | 429/150 |
| 2015/0311494 A1* | 10/2015 | Baker ..................... | C23C 14/34 |
| | | | 216/13 |
| 2018/0366697 A1* | 12/2018 | Elfering .............. | H01M 50/503 |
| 2022/0272466 A1* | 8/2022 | Bodvarsson ......... | H04R 25/602 |

FOREIGN PATENT DOCUMENTS

KR 102661408 B1 * 4/2024 .......... H01M 50/124

OTHER PUBLICATIONS

English Translation of KR 102661408 B1—Preparation method for
sealed battery and sealed battery prepared therefrom; Apr. 29,
2024—having priority date of Oct. 7, 2019 (Year: 2024).*

* cited by examiner

*Primary Examiner* — Adam J Francis
(74) *Attorney, Agent, or Firm* — BakerHostetler

(57) ABSTRACT

Aspects of the present disclosure involve various battery
packs. In general, the battery pack includes a plurality of
layers and an enclosure enclosing the plurality of layers. A
cathode terminal and an anode terminal extend from a first
face of the enclosure. The cathode terminal and the anode
terminal are connected to the plurality of layers. A Parylene
coating may cover an entire surface of the enclosure except
for at least a portion of a surface of the first face.

10 Claims, 7 Drawing Sheets

700

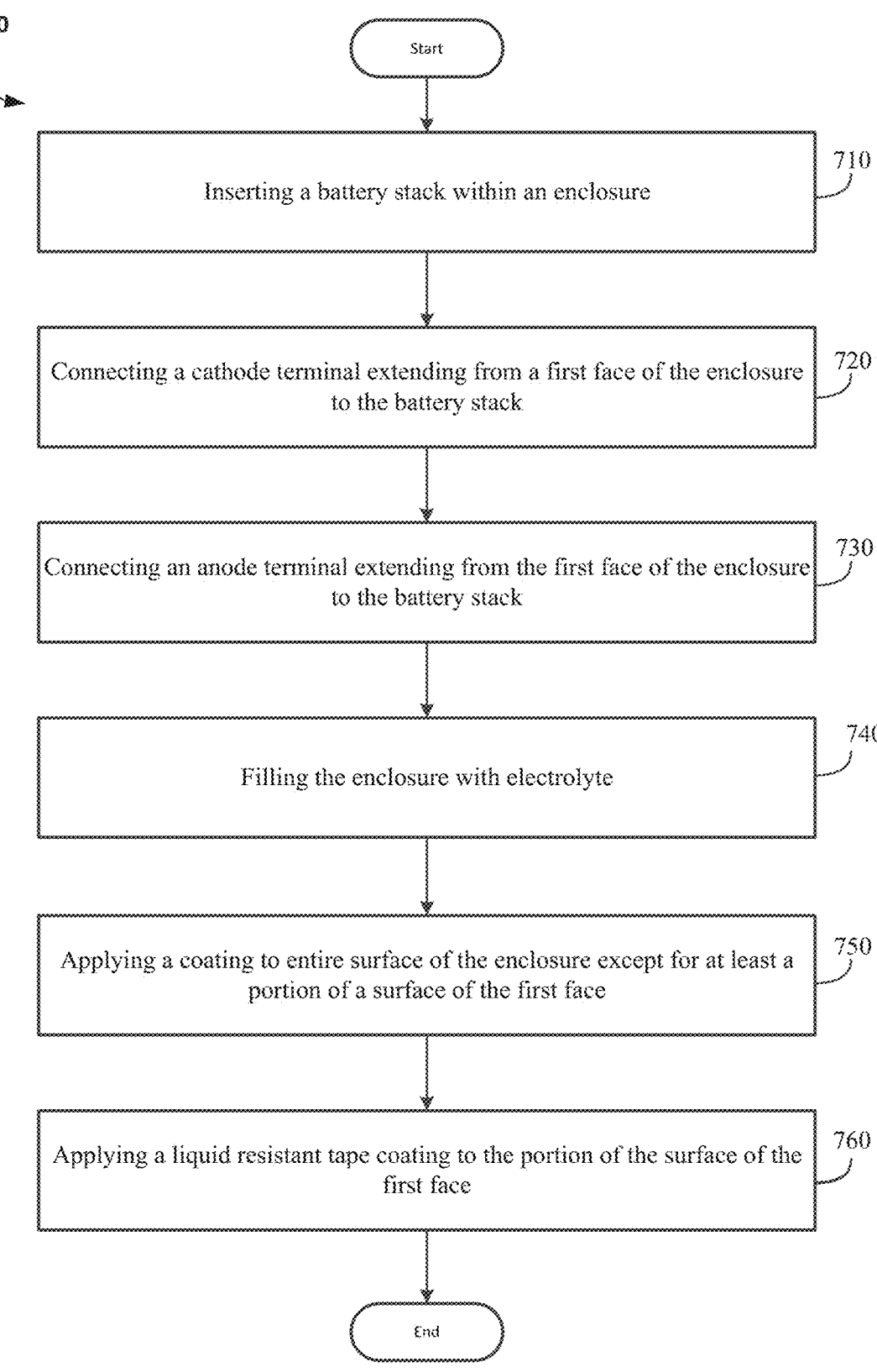

Start

Inserting a battery stack within an enclosure — 710

Connecting a cathode terminal extending from a first face of the enclosure to the battery stack — 720

Connecting an anode terminal extending from the first face of the enclosure to the battery stack — 730

Filling the enclosure with electrolyte — 740

Applying a coating to entire surface of the enclosure except for at least a portion of a surface of the first face — 750

Applying a liquid resistant tape coating to the portion of the surface of the first face — 760

End

FIG. 7

LIQUID RESISTANT BATTERY PACK

PRIORITY

The disclosure claims the benefit under 35 U.S.C. § 119(e) of U.S. Provisional Patent Application No. 63/248,251 entitled "Liquid Resistant Battery Pack", filed on Sep. 24, 2021, and U.S. Provisional Patent Application No. 63/248, 258 entitled "Liquid Resistant Battery Pack", filed on Sep. 24, 2021, both of which are incorporated herein by reference in their entirety.

TECHNICAL FIELD

This disclosure relates generally to battery systems, and more specifically to battery packs.

BACKGROUND

A battery may malfunction if moisture or liquid infiltrates the battery. However, preventing moisture or liquid from infiltrating the battery is a continual challenge. Many existing batteries lack sufficient protection from such infiltration. It is with these and other issues in mind that various aspects of the present disclosure were developed.

SUMMARY

In one aspect, the disclosure is directed to a battery pack that provides increased liquid resistance for higher battery performance. In general, the battery pack may include a plurality of layers, and an enclosure enclosing the plurality of layers. A cathode terminal and an anode terminal may extend from a first face of the enclosure. The cathode terminal and the anode terminal may be connected to the plurality of layers. The battery pack may include a Parylene coating covering an entire surface of the enclosure except for at least a portion of a surface of the first face.

In a further aspect, the disclosure is directed to a method for manufacturing a battery pack that provides increased liquid resistance for higher battery performance. A plurality of layers may be inserted into an enclosure. A cathode terminal extending from a first face of the enclosure may be connected to the plurality of layers. An anode terminal extending from the first face of the enclosure may be connected to the plurality of layers. A Parylene coating may be applied to an entire surface of the enclosure except for at least a portion of a surface of the first face.

In a further aspect, the disclosure is directed to a portable electronic device including a set of components powered by a battery pack that provides increased liquid resistance for higher battery performance. The portable electronic device may include a device enclosure configured to receive the battery pack. The battery pack may include a plurality of layers and an enclosure enclosing the plurality of layers. The battery pack may include a cathode terminal and an anode terminal extending from a first face of the enclosure. The cathode terminal and the anode terminal may be connected to the plurality of layers. The battery pack may include a Parylene coating covering an entire surface of the enclosure except for at least a portion of a surface of the first face.

In a further aspect, the disclosure is directed to a battery pack that provides increased liquid resistance for higher battery performance. In general, the battery pack includes a plurality of layers, and an enclosure enclosing the plurality of layers. A cathode terminal and an anode terminal may extend from a first face of the enclosure. The cathode terminal and the anode terminal may be connected to the plurality of layers. A connector comprising a portion external to the enclosure may be configured to connect the cathode terminal or the anode terminal to the plurality of layers. The battery pack may include a coating covering an entire surface of the enclosure except for at least a portion of a surface of the first face.

In a further aspect, the disclosure is directed to a method for manufacturing a battery pack that provides increased liquid resistance for higher battery performance. A plurality of layers may be inserted into an enclosure. A cathode terminal extending from a first face of the enclosure may be connected to the plurality of layers. One end of a connector may be connected to an anode terminal extending from the first face of the enclosure. Another end of the connector may be connected to the plurality of layers. The connector may comprise a portion external to the enclosure. A coating may be applied to an entire surface of the enclosure except for at least a portion of a surface of the first face.

In a further aspect, the disclosure is directed to a portable electronic device including a set of components powered by a battery pack that provides increased liquid resistance for higher battery performance. The portable electronic device may include a device enclosure configured to receive the battery pack. The battery pack may include a plurality of layers and an enclosure enclosing the plurality of layers. The battery pack may include a cathode terminal and an anode terminal extending from a first face of the enclosure. The cathode terminal and the anode terminal may be connected to the plurality of layers. A connector comprising a portion external to the enclosure may be configured to connect the cathode terminal or the anode terminal to the plurality of layers. The battery pack may include a coating covering an entire surface of the enclosure except for at least a portion of a surface of the first face.

BRIEF DESCRIPTION OF THE DRAWINGS

Although the following figures and description illustrate specific embodiments and examples, the skilled artisan will appreciate that various changes and modifications may be made without departing from the spirit and scope of the disclosure.

FIG. 7 illustrates an example method for manufacturing a battery pack.

DETAILED DESCRIPTION

Figure 1B:
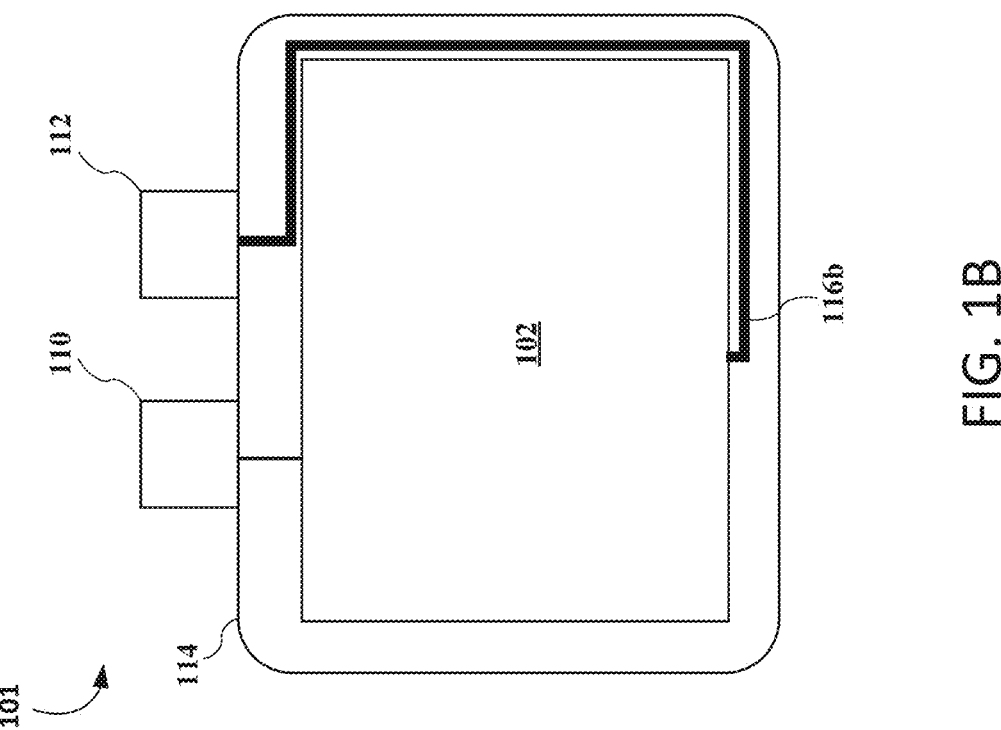
FIG. 1B a cross-section view of a battery pack including an internal connecter.

As noted above, aspects of the present disclosure involve a battery pack that provides increased liquid resistance for higher battery performance. In general, the battery pack may include a plurality of layers, and an enclosure enclosing the plurality of layers. A cathode terminal and an anode terminal may extend from a first face of the enclosure. The cathode terminal and the anode terminal may be connected to the plurality of layers. The battery pack may include a conformal liquid resistant and/or liquid proof coating, such as a Parylene coating, covering an entire surface of the enclosure except for at least a portion of a surface of the first face. The conformal coating may protect the entire surface of the enclosure except for the portion of the surface of the first face from moisture and liquid infiltration.

Through this particular battery pack design, several advantages may be obtained over conventional battery packs. For example, conventional battery packs may include a cathode terminal and an anode terminal extending from two different faces of the battery enclosure. It may be difficult to sufficiently protect such batteries from liquid, as it may be impossible to apply a layer of liquid resistant protection on either of these two faces due to the protruding terminals. As a result, such conventional battery packs are vulnerable to moisture and liquid infiltration through either of these two faces. The improved battery pack described herein includes a cathode terminal and an anode terminal extending from the same face of the enclosure. Because the cathode terminal and anode terminal extend from the same face of the enclosure, a conformal coating may cover the entire surface of the enclosure apart from a portion of a surface of the face of the enclosure from which the terminals extend. This increased surface coverage can result in a battery pack that is more resistant to moisture and liquid infiltration.

Additional features of the battery can design may also be considered and/or included to improve the liquid-resistance of the battery pack. For example, in some embodiments, the portion of the surface of the first face that is not covered by the conformal coating may include a region of the surface of the first face from which the cathode terminal and the anode terminal extend. A liquid resistant tape coating may cover the portion of the surface of the first face. The liquid resistant tape coating may protect the portion of the surface of the first face from moisture and liquid infiltration.

In some embodiments, the battery pack includes a connector. The connector may comprise a portion external to the enclosure. The connector may be configured to connect the cathode terminal or the anode terminal to the plurality of layers. Utilizing the connector to connect the terminal or the anode terminal to the plurality of layers may enable the cathode terminal and the anode terminal to extend from the same face of the enclosure (e.g., the first face of the enclosure). The conformal coating may further cover a surface of the external portion of the connector to protect the connector from moisture and liquid infiltration.

In some embodiments, the external portion of the connector may be connected to the first face of the enclosure at a first position and may be connected to a second face of the enclosure at a second position. A first liquid resistant tape coating may cover the first position and a second liquid resistant tape coating may cover the second position. The first and second liquid resistant tape coatings may protect the first and second connection positions from moisture and liquid infiltration.

In some embodiments, the battery pack may be received by a device enclosure in a portable electronic device. The portable electronic device may include a set of components powered by the battery pack. When received by the device enclosure, as least some portions of the battery pack may receive additional protection against moisture or liquid infiltration. For example, a top portion of the battery pack may receive additional protection against moisture or liquid infiltration from the device enclosure when the battery pack is received by the device enclosure. The top portion of the battery pack may, for example, include the first face of the enclosure. A bottom portion of the battery pack may not receive additional protection against moisture or liquid infiltration from the device enclosure when the battery pack is received by the device enclosure. The bottom portion of the battery pack may include the second face of the enclosure. A liquid resistant tape coating may cover at least a portion of a surface of a second face of the enclosure. The liquid resistant tape coating may protect the second face of the enclosure from moisture and liquid infiltration.

In some embodiments, the battery pack may have any shape or size, giving the battery assembly substantial form factor flexibility. For example, the battery pack may be formed to fit within a prescribed area within a device, such as a portable electronic device. This form may include any number of sides, angles, and/or shapes to account for one or more other components within the computing device casing. However, any shape or size of the battery pack is contemplated.

The various designs and methods disclosed herein provide for battery packs for any type of electrical device. It will be appreciated that, although some of the example implementations described herein involve the battery providing power to a type of electrical device, such as a portable electronic device, the battery pack designs and methods described herein may apply to any type of electrical device, computing system or mobile device where power from a battery may be desired to power the device. As used herein, the term "plurality of layers" (otherwise referred to as a "battery stack") may include, but is not limited to, a stacked-electrode or wound jelly roll configuration. Further, any type of lithium-ion cell may be used with the embodiments and designs of the battery pack described herein.

Figure 1A:
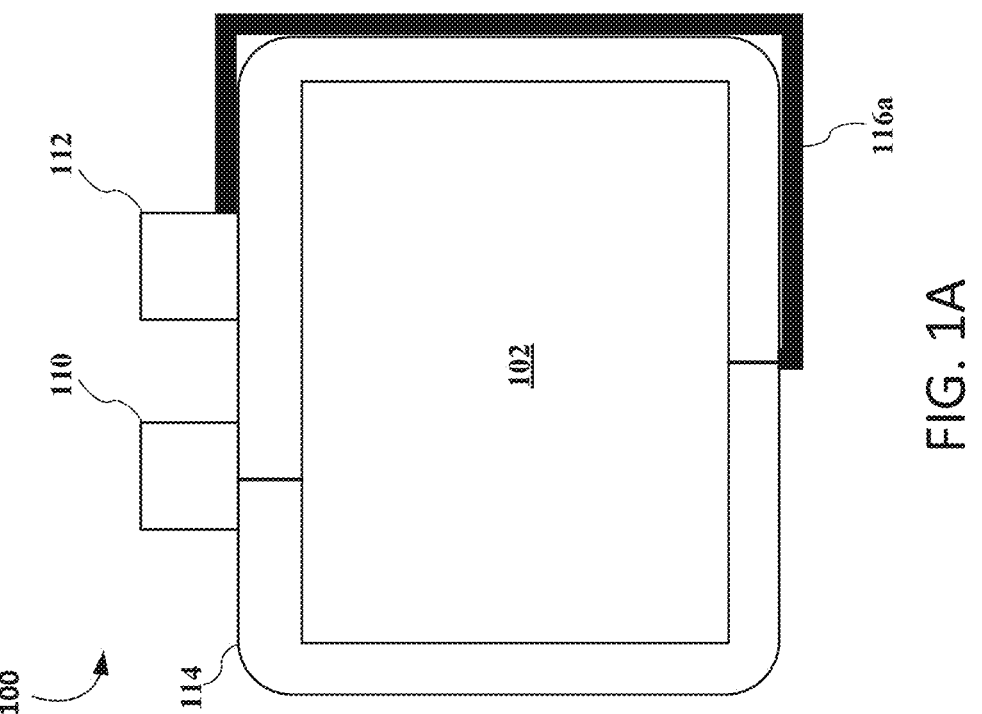
FIG. 1A is a cross-section view of a battery pack including a connecter comprising an external portion.

FIG. 1A is a cross section view of a battery pack 100. In particular, the battery pack 100 includes a plurality of layers 102 and an enclosure 114 enclosing the plurality of layers 102. The plurality of layers 102 may include a cathode with an active coating, a separator, and an anode with an active coating. For example, the cathode may be an aluminum foil coated with a lithium compound (e.g., LiCoO2, LiNCoMn, LiCoAl or LiMn2O4) and the anode may be a copper foil coated with carbon or graphite. The separator may include polyethylene (PE), polypropylene (PP), and/or a combination of PE and PP, such as PE/PP or PP/PE/PP. The separator comprises a micro-porous membrane that also provides a "thermal shut down" mechanism. If the battery cell reaches the melting point of these materials, the pores shut down which prevents ion flow through the membrane.

The plurality of layers may be wound to form a jelly roll structure or can be stacked to form a stacked-cell structure. The plurality of layers may be enclosed within the enclosure 114 and immersed in an electrolyte, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The enclosure 114 may comprise a plurality of faces (e.g., sides). For example, the enclosure 114 may comprise a top face, a bottom face, and one or more side faces. However, it should be appreciated that the enclosure may be any size or shape and may include any number of faces and/or angles.

The battery pack 100 includes an anode terminal 112 and a cathode terminal 110. The anode terminal 112 and the cathode terminal 110 may extend from the same face of the enclosure 114. For example, the anode terminal 112 and the cathode terminal 110 may extend from a top face of the enclosure. The anode terminal 112 and the cathode terminal 110 may be connected to the plurality of layers 102. For example, the anode terminal 112 may be connected to an anode layer in the plurality of layers 102. Likewise, the cathode terminal 110 may be connected to a cathode layer in the plurality of layers 102.

The battery pack 100 includes a connector 116a (e.g., busbar). The connector 116 may comprise a portion external to the enclosure 114. The connector 116a may be configured to connect the anode terminal 112 to the plurality of layers 102. For example, the connector 116a may be configured to connect the anode terminal 112 to an anode layer in the plurality of layers 102. In another embodiment, the connector 116a may be configured to connect the cathode terminal 110 to the plurality of layers 102. For example, the connector 116a may be configured to connect the cathode terminal 110 to a cathode layer in the plurality of layers 102.

The external portion of the connector 116a may be positioned along an outer surface of the enclosure 114. One end of the external portion of the connector 116a may be connected (e.g., joined) to the face of the enclosure from which the anode terminal 112 and the cathode terminal 110 extend at a first position. The other end of the external portion of the connector 116a may be connected (e.g., joined) to a different face of the enclosure, such as the face opposite the face from which the anode terminal 112 and the cathode terminal 110 extend, at a second position.

FIG. 1B is a cross section view of a battery pack 101. In particular, the battery pack 101 includes the plurality of layers 102 and the enclosure 114 enclosing the plurality of layers 102. The battery pack 101 includes the anode terminal 112 and the cathode terminal 110 extending from the same face of the enclosure 114.

The anode terminal 112 and the cathode terminal 110 may be connected to the plurality of layers 102. For example, the anode terminal 112 may be connected to an anode layer in the plurality of layers 102. Likewise, the cathode terminal 110 may be connected to a cathode layer in the plurality of layers 102.

The battery pack 100 includes an internal connector 116b. The internal connector 116b may be positioned entirely within the enclosure 114. The internal connector 116b may be configured to connect the anode terminal 112 to the plurality of layers 102. For example, the internal connector 116b may be configured to connect the anode terminal 112 to an anode layer in the plurality of layers 102. In another embodiment, the internal connector 116b may be configured to connect the cathode terminal 110 to the plurality of layers 102. For example, the internal connector 116b may be configured to connect the cathode terminal 110 to a cathode layer in the plurality of layers 102.

As discussed above, a battery pack including a cathode terminal and an anode terminal extending from the same face of the enclosure may be able to experience a greater resistance to moisture and liquid. Because the cathode terminal and anode terminal extend from the same face of the enclosure, a conformal liquid resistant and/or liquid proof coating may cover the entire surface of the enclosure apart from a portion of a surface of the face of the enclosure from which the terminals extend. This increased surface coverage can result in a battery pack that is more resistant to moisture and liquid infiltration.

Figure 2B:
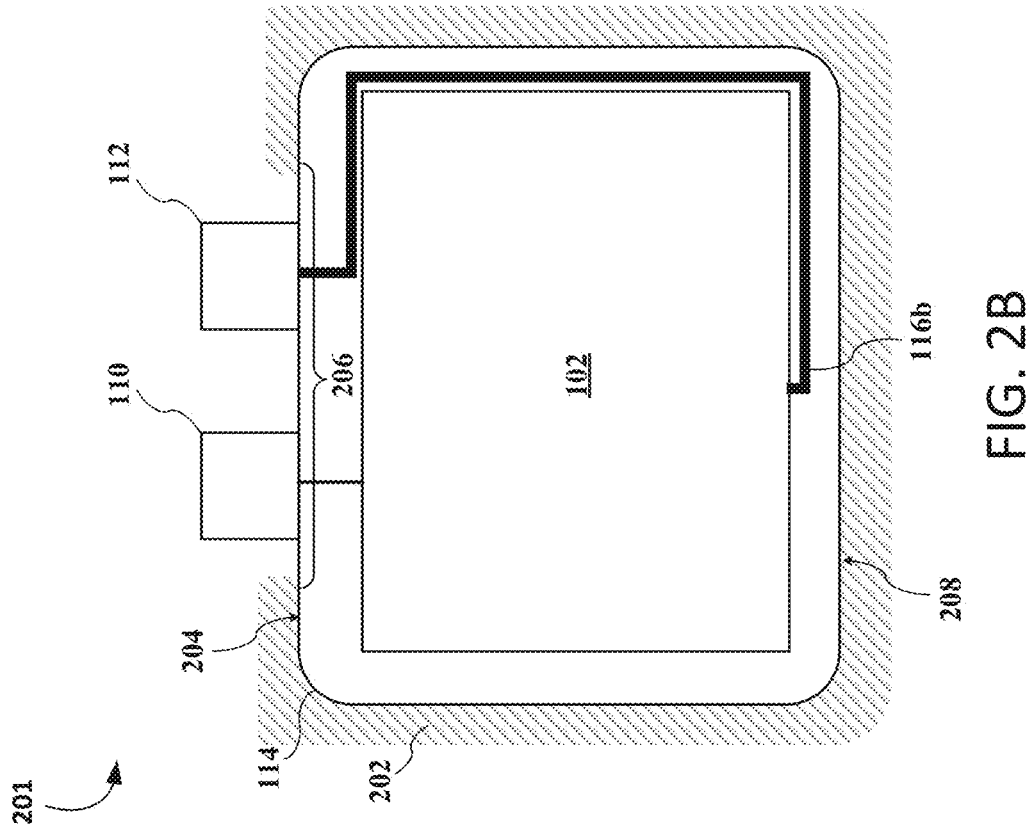
FIG. 2B is a cross-section view of a battery pack including an internal connecter and a partial conformal coating.
Figure 2A:
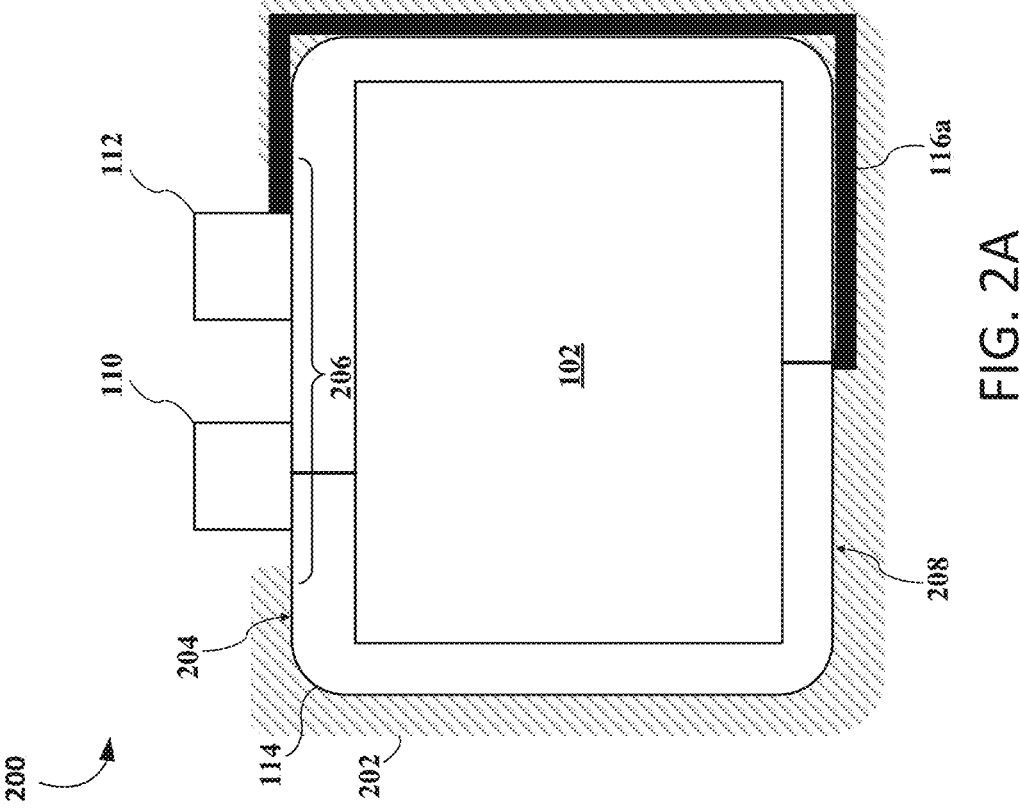
FIG. 2A is a cross-section view of a battery pack including a connecter comprising an external portion and a partial conformal coating.

FIG. 2A is a cross-section view of a battery pack 200 including the external connecter 116a and a conformal coating 202. The conformal coating 202 may be a liquid resistant and/or liquid proof coating. The conformal coating 202 may be, for example, a Parylene coating and/or any coating that is a material comprising Parylene. In particular, the battery pack 200 includes the plurality of layers 102 and the enclosure 114 enclosing the plurality of layers 102.

The enclosure 114 includes a plurality of faces (e.g., sides). For example, the enclosure 114 includes a first face 204 and a second face 208. However, it should be appreciated that the enclosure 114 may be any size or shape and may include any number of faces and/or angles.

The battery pack 200 includes the anode terminal 112 and the cathode terminal 110 extending from the first face 204 of the enclosure 114. The anode terminal 112 and the cathode terminal 110 may be connected to the plurality of layers 102. For example, the anode terminal 112 may be connected to an anode layer in the plurality of layers 102. Likewise, the cathode terminal 110 may be connected to a cathode layer in the plurality of layers 102.

The battery pack 200 includes the connector 116a (e.g., busbar). As discussed above, the connector 116a may comprise a portion external to the enclosure 114 and may be configured to connect the anode terminal 112 to the plurality of layers 102. For example, the connector 116a may be configured to connect the anode terminal 112 to an anode layer in the plurality of layers 102. In another embodiment, the connector 116a may be configured to connect the cathode terminal 110 to the plurality of layers 102. For example, the connector 116a may be configured to connect the cathode terminal 110 to a cathode layer in the plurality of layers 102.

The external portion of the connector 116a may be positioned along an outer surface of the enclosure 114. One end of the external portion of the connector 116a may be connected (e.g., joined) to the first face 204 of the enclosure at a first position. The other end of the external portion of the connector 116a may be connected (e.g., joined) to the second face 208 of the enclosure at a second position.

The battery pack 200 includes a conformal coating 202. The conformal coating 202 may be a liquid resistant and/or liquid proof coating. The conformal coating 202 may be, for example, a Parylene coating and/or any coating that is a material comprising Parylene. The conformal coating 202 may cover the entire surface of the enclosure 114 apart from a portion 206 of a surface of the first face 204. The portion 206 of the surface of the first face 204 comprises a region of the surface of the first face 204 from which the cathode terminal 110 and the anode terminal 112 extend. The conformal coating 202 may additionally cover a surface of the external portion of the connector 116a.

FIG. 2B is a cross-section view of a battery pack 201 including the internal connecter 116b and the conformal coating 202. In particular, the battery pack 201 includes the plurality of layers 102 and the enclosure 114 enclosing the plurality of layers 102.

The enclosure 114 includes a plurality of faces (e.g., sides). For example, the enclosure 114 includes a first face 204 and a second face 208. However, it should be appreciated that the enclosure 114 may be any size or shape and may include any number of faces and/or angles.

The battery pack 201 includes the anode terminal 112 and the cathode terminal 110 extending from the first face 204 of the enclosure 114. The anode terminal 112 and the cathode terminal 110 may be connected to the plurality of layers 102. For example, the anode terminal 112 may be connected to an anode layer in the plurality of layers 102. Likewise, the cathode terminal 110 may be connected to a cathode layer in the plurality of layers 102.

The battery pack 201 includes the internal connector 116*b*. As discussed above, the internal connector 116*b* may be configured to connect the anode terminal 112 to the plurality of layers 102. For example, the internal connector 116*b* may be configured to connect the anode terminal 112 to an anode layer in the plurality of layers 102. In another embodiment, the internal connector 116*b* may be configured to connect the cathode terminal 110 to the plurality of layers 102. For example, the internal connector 116*b* may be configured to connect the cathode terminal 110 to a cathode layer in the plurality of layers 102. The internal connector 116*b* may be positioned entirely within the enclosure 114.

The battery pack 201 includes the conformal coating 202. The conformal coating 202 may cover the entire surface of the enclosure 114 apart from the portion 206 of the surface of the first face 204. The portion 206 of the surface of the first face 204 comprises a region of the surface of the first face 204 from which the cathode terminal 110 and the anode terminal 112 extend.

Figure 3:
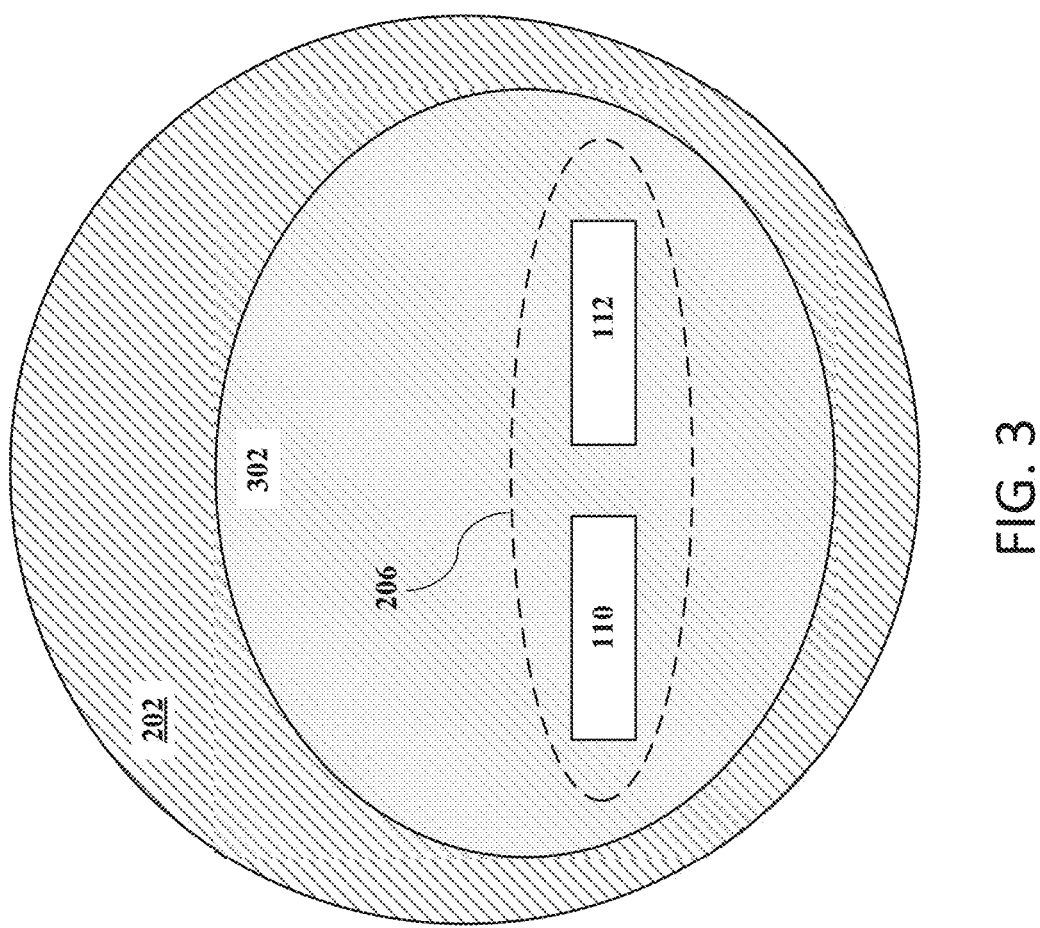
FIG. 3 is a top view of the battery pack of FIGS. 2A-2B.
Figure 3:

FIG. 3 is a view of the first face 204 of the battery packs 200, 201. As discussed above, the battery packs 200, 201 include the conformal coating 202. The conformal coating 202 may cover the entire surface of the enclosure 114 apart from the portion 206 of the surface of the first face 204. The portion 206 of the surface of the first face 204 comprises a region of the surface of the first face 204 from which the cathode terminal 110 and the anode terminal 112 extend.

The battery packs 200, 201 may include a liquid resistant tape coating 302 covering the portion 206 of the surface of the first face 204. Because the portion 206 of the surface of the first face 204 is not covered by the conformal coating 202, it may be necessary to provide the portion 206 of the surface of the first face 204 with a layer of protection against moisture and liquid. The liquid resistant tape coating 302 may provide such protection.

Figures 4A, 4B:
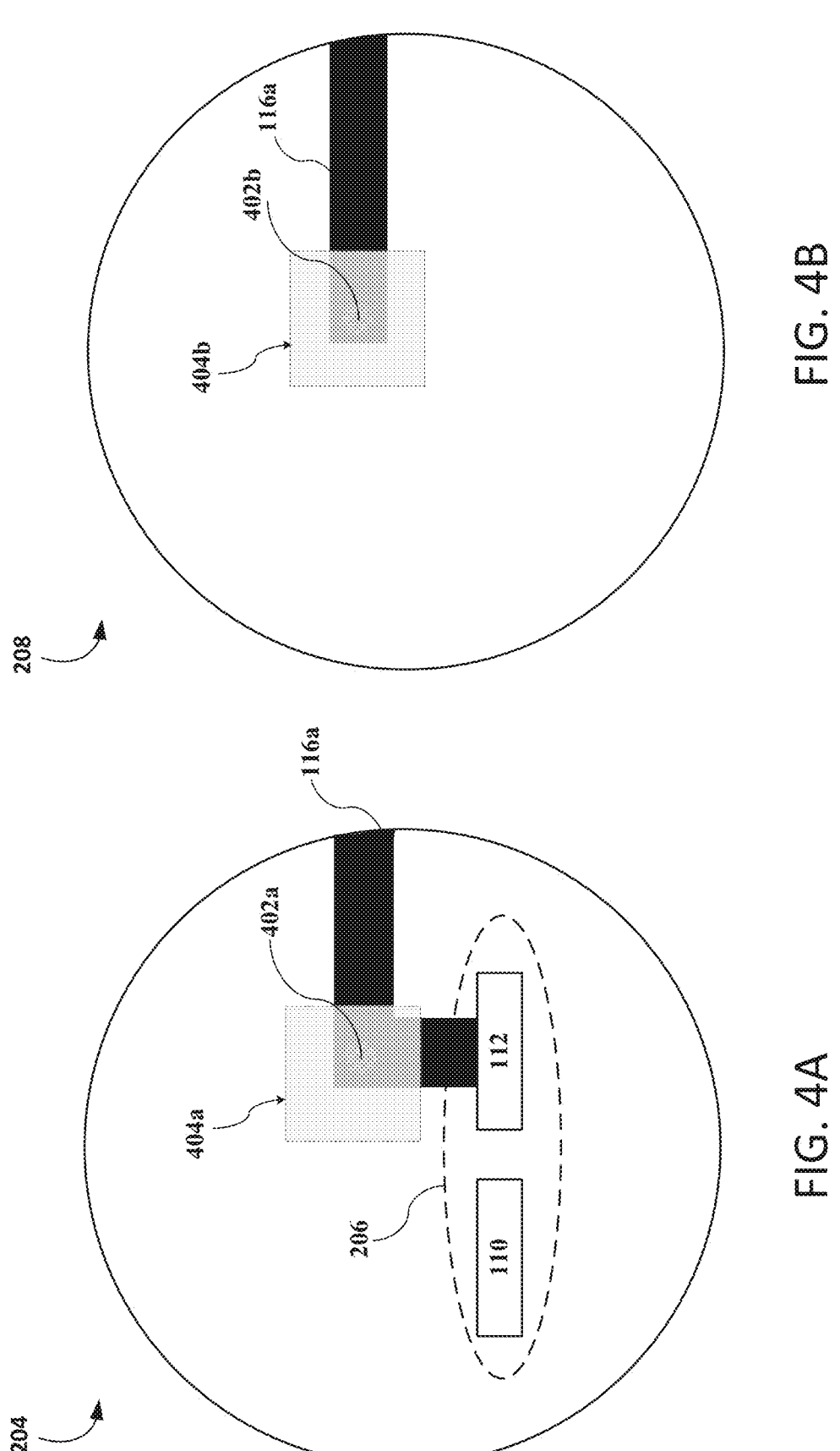
FIG. 4A is a top view of the battery pack of FIG. 2A.
FIG. 4B is a bottom view of the battery pack of FIG. 2A.

FIG. 4A is a top view of the battery pack 200 and FIG. 4B is a bottom view of the battery pack 200. As discussed above, the battery pack 200 includes the connector 116*a* (e.g., busbar). The connector 116*a* may comprise a portion external to the enclosure 114 and may be configured to connect the anode terminal 112 to the plurality of layers 102. For example, the connector 116*a* may be configured to connect the anode terminal 112 to an anode layer in the plurality of layers 102. In another embodiment, the connector 116*a* may be configured to connect the cathode terminal 110 to the plurality of layers 102. For example, the connector 116*a* may be configured to connect the cathode terminal 110 to a cathode layer in the plurality of layers 102.

The external portion of the connector 116*a* may be positioned along an outer surface of the enclosure 114. One end of the external portion of the connector 116*a* may be connected (e.g., joined) to the first face 204 of the enclosure 114 at a first position 402*a*. The other end of the external portion of the connector 116*a* may be connected (e.g., joined) to the second face 208 of the enclosure at a second position 402*b*.

The positions 402*a-b* may be particularly vulnerable to moisture and liquid infiltration, despite already being covered by the conformal coating 202. To prevent such infiltration, an additional layer of liquid-resistant protection may be used. A first liquid resistant tape coating 404*a* may cover the first position 402*a*. A second liquid resistant tape coating 404*b* may cover the second position 402*b*. The first liquid resistant tape coating 404*a* and the second liquid resistant tape coating 404*b* may be positioned under the conformal coating 202. Alternatively, the first liquid resistant tape coating 404*a* and the second liquid resistant tape coating 404*b* may be positioned on top of the conformal coating 202.

In some embodiments, the battery packs 200 or the battery pack 201 may be received by a device enclosure in a portable electronic device. The portable electronic device may include a set of components powered by the battery pack 200 or the battery pack 201. When received by the device enclosure, as least some portions of the battery pack 200 or the battery pack 201 may receive additional protection against moisture or liquid infiltration. For example, a top portion of the battery pack 200 or the battery pack 201 may receive additional protection against moisture or liquid infiltration from the device enclosure when the battery pack is received by the device enclosure. The top portion of the battery pack 200 or the battery pack 201 may, for example, include the first face 204 of the enclosure 114.

A bottom portion of the battery pack may not receive additional protection against moisture or liquid infiltration from the device enclosure when the battery pack is received by the device enclosure. The bottom portion of the battery pack may include the second face 208 of the enclosure 114. Accordingly, the second face 208 of the enclosure 114 may need additional protection against moisture and liquid infiltration.

Figure 5:
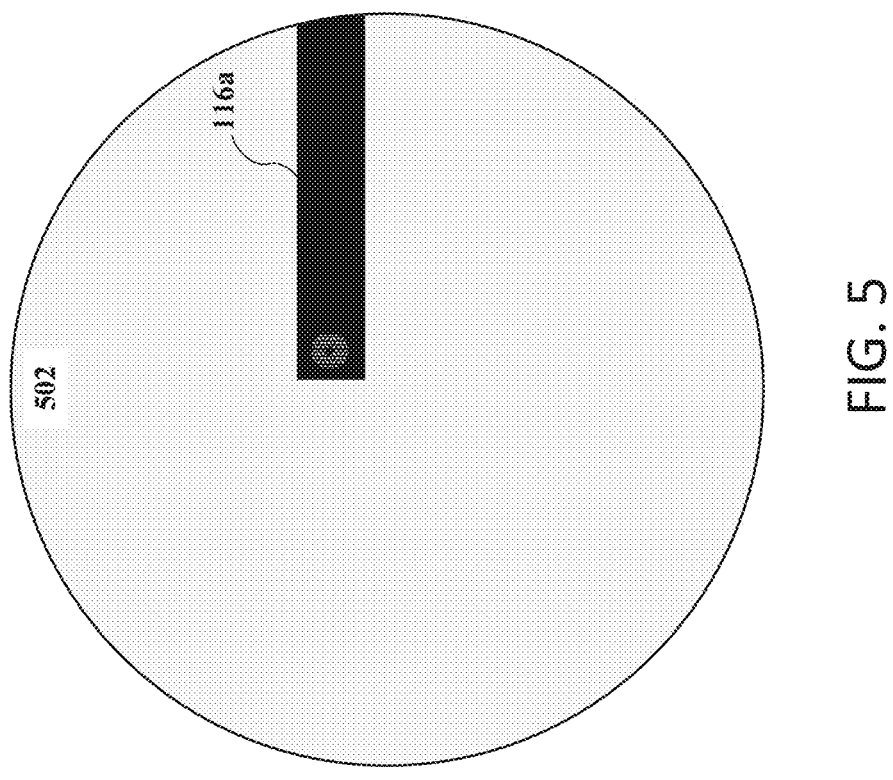
FIG. 5 is a bottom view of the battery pack of FIG. 2A.
Figure 5:

FIG. 5 is a bottom view of the battery pack 200. A liquid resistant tape coating 502 may cover at least a portion of the surface of the second face 208 of the enclosure 114. The liquid resistant tape coating 502 may protect the second face 208 of the enclosure 114 from moisture and liquid infiltration. The liquid resistant tape coating 502 may be applied to the second face 208 of the enclosure 114 in addition to the conformal coating 202. For example, the liquid resistant tape coating 502 may be positioned under the conformal coating 202. Alternatively, the liquid resistant tape coating 502 may be positioned on top of the conformal coating 202. The liquid resistant tape coating 502 may be applied either over or under the external portion of the connector 116*a*. The liquid resistant tape coating 502 may provide the second face 208 of the enclosure 114 with additional protection against moisture and liquid infiltration.

While FIG. 5 depicts a bottom view of the battery pack 200, it should be appreciated that a similar liquid resistant tape coating may be applied to the second face 208 of the enclosure 114 of the battery pack 201 to provide the second face 208 of the enclosure 114 with additional protection against moisture and liquid infiltration.

Figure 6:
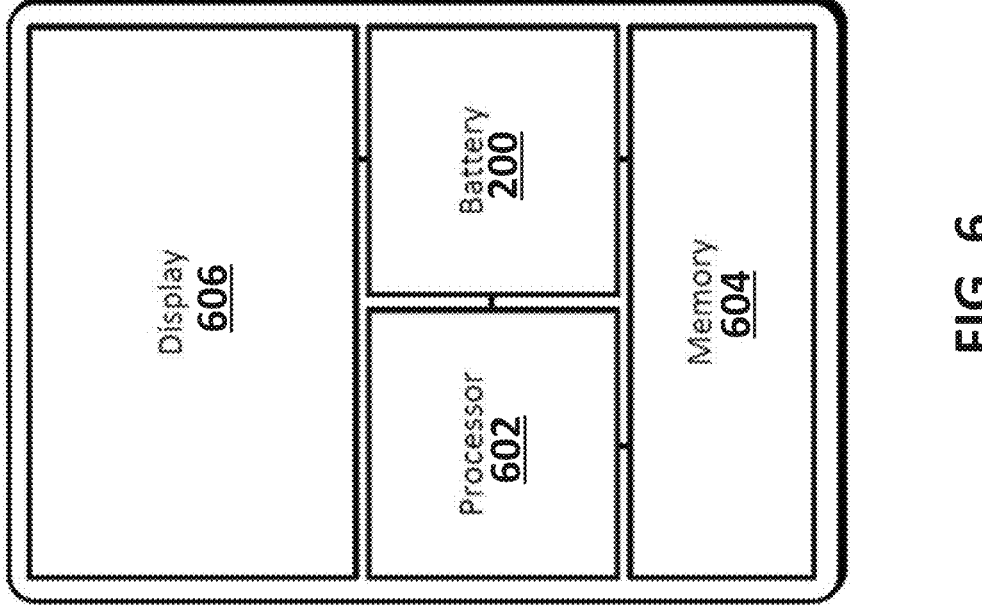
FIG. 6 is a portable electronic device.

FIG. 6 illustrates a portable electronic device 600, in accordance with various aspects of the subject technology. The battery pack 200 can generally be used in any type of electronic device. For example, FIG. 6 illustrates a portable electronic device 600 which includes a processor 602, a memory 604 and a display 606, which are all powered by the battery pack 200. Portable electronic device 600 may correspond to a laptop computer, tablet computer, mobile phone, personal digital assistant (PDA), digital music player, watch, and wearable device, and/or other type of battery-powered electronic device.

Battery pack 200 may include a plurality of layers 102 and an enclosure 114 enclosing the plurality of layers 102. Each battery pack 200 may include a cathode terminal 110 and an anode terminal 112 extending from a first face 204 of the enclosure 114. The cathode terminal 110 and the anode terminal 112 may be connected to the plurality of layers 102. A conformal coating 202 may cover an entire surface of the enclosure 114 except for at least a portion of a surface of the first face 204. The conformal coating 202 may protect the entire surface of the enclosure 114 except for the portion of the surface of the first face 204 from moisture and liquid infiltration.

While FIG. 6 depicts a portable electronic device including the battery pack 200, it should be appreciated that the battery pack 201 may alternatively be used to provide power to the components of a portable electronic device.

FIG. 7 illustrates an example method 700 for manufacturing a battery cell, such as the battery cell 200 or the battery cell 201, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 710, a plurality of layers 102 is inserted within an enclosure 114. The plurality of layers 102 may include a plurality of layers comprising a cathode with an active coating, a separator, and an anode with an active coating. The plurality of layers may be wound to form a jelly roll structure or can be stacked to form a stacked-cell structure.

At operation 720, a cathode terminal 110 extending from a first face 204 of the enclosure 114 may be connected to the plurality of layers 102. For example, the cathode terminal 110 extending from the first face 204 of the enclosure 114 may be connected to a cathode layer of the set of layers.

At operation 730, an anode terminal 112 extending from the first face 204 of the enclosure 114 may be connected to the plurality of layers 102. For example, an anode terminal 112 extending from a first face 204 of the enclosure 114 may be connected to an anode layer of the set of layers.

In some embodiments, the cathode terminal 110 is connected to the plurality of layers 102 or the anode terminal 112 is connected to the plurality of layers 102 using a connector 116*a*. For example, one end of the connector 116*a* may be connected to the anode terminal 112 and another end of the connector 116*a* may be connected to the plurality of layers 102. In other embodiments, the cathode terminal 110 is connected to the plurality of layers 102 or the anode terminal 112 is connected to the plurality of layers 102 using an internal connector 116*b*.

At operation 740, the enclosure 114 may be filled with an electrolyte. For example, the plurality of layers 102 may be immersed in an electrolyte.

At operation 750, a conformal coating 202 may be applied to an entire surface of the enclosure 114 except for at least a portion 206 of a surface of the first face 204. In some embodiments, the conformal coating 202 may further cover a surface of the external portion of the connector 116*a*. At operation 760, a liquid resistant tape coating 302 may be applied to the portion 206 of the surface of the first face 204. Operation 760 may occur before operation 750. Alternatively, operation 750 may occur before operation 760.

The battery cans, battery assemblies, and various non-limiting components and embodiments as described herein can be used with various electronic devices. Such electronic devices can be any electronic devices known in the art. For example, the device can be a telephone, such as a mobile phone, and a land-line phone, or any communication device, such as a smart phone, including, for example an iPhone®, and an electronic email sending/receiving device. The battery cans, battery assemblies, and various non-limiting components and embodiments as described herein can be used in conjunction with a display, such as a digital display, a TV monitor, an electronic-book reader, a portable web-browser (e.g., iPad®), watch and a computer monitor. The device can also be an entertainment device, including a portable DVD player, conventional DVD player, Blue-Ray disk player, video game console, music player, such as a portable music player (e.g., iPod®), etc. Devices include control devices, such as those that control the streaming of images, videos, sounds (e.g., Apple TV®), or a remote control for a separate electronic device. The device can be a part of a computer or its accessories, laptop keyboard, laptop track pad, desktop keyboard, mouse, and speaker.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A battery pack comprising:
a plurality of layers;
an enclosure enclosing the plurality of layers;
a cathode terminal and an anode terminal extending from a first face of the enclosure, wherein the cathode terminal and the anode terminal are connected to the plurality of layers;
a connector comprising a portion external to the enclosure, wherein the connector is configured to connect the cathode terminal or the anode terminal to the plurality of layers, and wherein the external portion of the connector is connected to the first face of the enclosure at a first position and is connected to a second face of the enclosure at a second position; and
a Parylene coating covering an entire surface of the enclosure except for at least a portion of a surface of the first face.

2. The battery pack of claim 1, further comprising:
a liquid resistant tape coating covering the portion of the surface of the first face.

3. The battery pack of claim 1, wherein the portion of the surface of the first face of the enclosure comprises a region of the surface of the first face from which the cathode terminal and the anode terminal extend.

4. The battery pack of claim 1, wherein the Parylene coating further covers a surface of the external portion of the connector.

5. The battery pack of claim 1, further comprising:
a first liquid resistant tape coating covering the first position; and
a second liquid resistant tape coating covering the second position.

6. The battery back of claim 1, further comprising:
a liquid resistant tape coating covering at least a portion of a surface of the second face of the enclosure.

7. A portable electronic device, comprising:
a set of components powered by a battery pack; and
a device enclosure configured to receive the battery pack, the battery pack comprising:
a plurality of layers;
an enclosure enclosing the plurality of layers;

a cathode terminal and an anode terminal extending from a first face of the enclosure, wherein the cathode terminal and the anode terminal are connected to the plurality of layers;

a connector comprising a portion external to the enclosure, wherein the connector is configured to connect the cathode terminal or the anode terminal to the plurality of layers, and wherein the external portion of the connector is connected to the first face of the enclosure at a first position and is connected to a second face of the enclosure at a second position; and a Parylene coating covering an entire surface of the enclosure except for at least a portion of a surface of the first face.

8. The portable electronic device of claim 7, wherein the battery pack further comprises a liquid resistant tape coating covering the portion of the surface of the first face.

9. The portable electronic device of claim 7, wherein the portion of the surface of the first face of the enclosure comprises a region of the surface of the first face from which the cathode terminal and the anode terminal extend.

10. The portable electronic device of claim 7, the battery pack further comprising:

a first liquid resistant tape coating covering the first position; and a second liquid resistant tape coating covering the second position.

* * * * *